United States Patent [19]

Chitnis et al.

[11] Patent Number: 5,300,215

[45] Date of Patent: Apr. 5, 1994

[54] CATALYTIC CRACKING WITH A CATALYST COMPRISING A BORON PHOSPHATE MATRIX

[75] Inventors: Girish K. Chitnis, Chadds Fords, Pa.; Joseph A. Herbst, Turnersville, N.J.

[73] Assignee: Mobil Oil Corporation, Fairfax, Va.

[21] Appl. No.: 914,252

[22] Filed: Jul. 15, 1992

Related U.S. Application Data

[63] Continuation-in-part of Ser. No. 645,761, Jan. 25, 1991, Pat. No. 5,151,394.

[51] Int. Cl.$^5$ .................. C10G 11/02; C10G 11/05
[52] U.S. Cl. ........................... 208/114; 201/113; 201/118; 201/119; 201/120
[58] Field of Search ............... 208/113, 114, 118, 119, 208/120

[56] References Cited

U.S. PATENT DOCUMENTS

| | | | |
|---|---|---|---|
| 2,564,268 | 8/1951 | Mathy et al. | 196/52 |
| 3,507,778 | 4/1970 | Gladrow et al. | 208/111 |
| 3,867,279 | 2/1975 | Young | 208/114 |
| 3,929,617 | 12/1975 | Henry et al. | 208/96 |
| 3,993,557 | 11/1976 | Pine | 208/111 |
| 4,228,036 | 10/1980 | Swift et al. | 252/437 |
| 4,295,955 | 10/1981 | Tu | 208/120 |
| 4,430,199 | 2/1984 | Durante et al. | 208/114 |
| 4,431,518 | 2/1984 | Angevine et al. | 208/114 |
| 4,456,780 | 6/1984 | Young | 585/475 |
| 4,498,975 | 2/1985 | Pine et al. | 208/114 |
| 4,567,152 | 1/1986 | Pine | 502/64 |
| 4,584,091 | 4/1986 | Pine | 208/114 |
| 4,762,962 | 8/1988 | Wideman | 585/671 |
| 4,839,319 | 6/1989 | Schnette et al. | 502/64 |
| 4,873,211 | 10/1989 | Walker et al. | 502/64 |
| 5,071,539 | 12/1991 | Hayward et al. | 208/114 |

FOREIGN PATENT DOCUMENTS 0176150 4/1986 European Pat. Off. .

OTHER PUBLICATIONS

Goltz, H. L., et al., "The Decomposition of Formic Acid on Boron Phosphate," Journal of Catalysis, 22, 85–96 (1971).

Ceramic Raw Materials, ed. D. J. De Renzo, Noyes Data Corp. (1987).

Scherzer, J. "Octane-Enhancing, Zeolitic FCC Catalysts: Scientific and Technical Aspects," Catal. Rev.-Sci. Eng., 31(3), 215–354 (1989).

*Primary Examiner*—R. Bruce Breneman
*Assistant Examiner*—Walter D. Griffin
*Attorney, Agent, or Firm*—Alexander J. McKillop; Malcolm D. Keen; Dennis P. Santini

[57] ABSTRACT

A process is provided for converting feedstock hydrocarbon compounds over a catalyst composition which comprises a molecular sieve material and a boron phosphate-containing matrix. An embodiment of the present invention comprises a catalytic cracking process to produce higher octane gasoline.

21 Claims, No Drawings

5,300,215

CATALYTIC CRACKING WITH A CATALYST COMPRISING A BORON PHOSPHATE MATRIX

CROSS-REFERENCE TO RELATED APPLICATIONS

This application is a continuation-in-part of application Ser. No. 07/645,761, filed Jan. 25, 1991, now U.S. Pat. No. 5,151,394.

BACKGROUND OF THE INVENTION

The present invention relates to a process for converting, e.g., cracking, a hydrocarbon feed over a particular catalyst composition to produce conversion product, e.g., gasoline of higher octane. The catalyst composition for use herein comprises a molecular sieve material and a matrix material which contains boron phosphate.

There is a growing need for higher octane in the refinery gasoline pool, particularly since the phase-out of lead additives for gasoline both in the U.S. and abroad. Decreases in octane sensitivity, i.e., the difference between research and motor octane, are especially desirable.

Cracking catalysts for use in petroleum processing generally consist of a zeolitic component and a matrix. The zeolitic material is generally dispersed in an inorganic oxide-type sol or gel matrix material to which one or more clays are added.

Because of the need for higher octane gasoline, there has been an emphasis on octane-increasing improvements in cracking catalysts. Octane-enhancing zeolitic fluid cracking catalysts have been reviewed recently by Scherzer, *J. Catal. Rev. Sci. Eng.* 31 (3), 215-354 (1989). The matrix components described in the article include natural or modified clays and inorganic oxides such as silica, alumina, silica-alumina and silica-magnesia. Other inorganic oxides described for matrices are $TiO_2$, $ZrO_2$, $P_2O_5$, and $B_2O_3$. The use of boron phosphate is not suggested.

Cracking catalysts comprising a zeolite and a matrix material containing aluminum phosphate have been described, for example, in U.S. Pat. Nos. 4,873,211 and 4,228,036. Cracking catalysts comprising a zeolite and an inorganic oxide matrix which contains phosphorus-treated alumina particles are described in U.S. Pat. Nos. 4,567,152 and 4,584,091 and in European Patent Application 176,150. The treatment of zeolite catalysts with phosphoric acid to provide a phosphorus containing catalyst is described in U.S. Pat. Nos. 4,839,319 and 4,498,975.

In U.S. Pat. No. 4,430,199, tricresyl or ammonium hydrogen phosphate is impregnated into a cracking catalyst to improve the tolerance toward poisoning metals. In addition, boron may be added as a passivating agent.

Boron phosphate itself has been used as a catalyst. For example, U.S. Pat. No. 4,762,962 describes its use as a catalyst for the isomerization of branched dienes.

The use of boron phosphate as a matrix component for cracking catalysts has not been suggested.

Accordingly, it is an object of the present invention to provide an improved cracking process using an improved catalyst.

It is a further object of the invention to provide for the use of a modified catalyst composition to impart an octane-enhancing property in the present catalytic cracking process.

It is a particular object of the invention to provide for the use of a catalyst composition comprising a molecular sieve material and a matrix material comprising boron phosphate in hydrocarbon cracking to result in the production of gasoline of higher octane.

SUMMARY OF THE INVENTION

These and other objects are achieved by the present invention which provides a process for converting feedstock hydrocarbon compounds to product hydrocarbon compounds of lower molecular weight than the feedstock hydrocarbon compounds which comprises contacting the feedstock at conversion conditions with catalyst comprising a molecular sieve and a matrix which comprises boron phosphate. More particularly, the invention provides a hydrocarbon cracking process which uses a catalyst composition comprising a molecular sieve and a matrix which comprises boron phosphate.

The catalyst composition may be prepared by combining a slurry of the molecular sieve and a slurry comprising a boron phosphate-containing matrix material. The combined slurries are dewatered, reslurried, homogenized, and spray dried.

In the process for cracking a hydrocarbon feedstock, the feedstock is contacted under catalytic cracking conditions with a catalyst composition comprising a molecular sieve and a matrix material which comprises boron phosphate to yield a product with enhanced octane.

Advantageously, the use of the catalyst composition in the cracking process results in a gasoline product with higher octane and higher amounts of potential alkylate which can be subsequently processed to yield a high octane gasoline.

For a better understanding of the present invention, together with other and further objects, reference is made to the following description and its scope will be pointed out in the appended claims.

DETAILED DESCRIPTION

Parent application Ser. No. 07/645,761, now U.S. Pat. No. 5,151,394 is incorporated herein by reference in its entirety.

It has been found that the use of boron phosphate in cracking catalyst compositions causes advantageous octane-yield shifts as compared with cracking catalyst compositions with conventional matrix materials. The yield shifts result in gasoline of higher octane as indicated by an increase in gasoline RON, MON, and an increase in gasoline plus potential alkylate RON. RON signifies the research octane number, MON signifies the motor octane number, and the terms are used to describe the knocking characteristics of gasoline, that is, its combustion behavior.

In catalytic cracking, high molecular weight hydrocarbons are converted to lower molecular weight hydrocarbons of suitable volatility to permit their use as liquid fuels. The combustion characteristics of gasoline are assessed empirically by assigning the fuel an octane rating. This is generally defined as a comparison with a primary reference which is the percentage of iso-octane (2,2,4-trimethylpentane) in an n-heptane/iso-octane mixture to which the gasoline under examination is equivalent in terms of combustion behavior when considering the octane ratings of n-heptane and iso-octane to be zero and 100 respectively. Both RON and MON can be tested on the same single-cylinder, four-stroke engine of standardized design. For a measurement of RON, the engine speed used is 600 rpm which yields results comparable to an automobile engine operated at low speed. For a measurement of MON, the engine speed is 900 rpm which approximates higher speed cruising conditions. Generally, higher octane numbers are found by the research method compared to the motor method for the same gasoline sample. The average of the RON and MON, known as the road octane number, gives an indication of typical performance in an engine. The higher the octane, the better the combustion behavior in a spark-ignition engine. It has been found that road octane number correlates much more closely to the motor octane number than the research octane. Generally, aromatics and branched paraffinic and olefinic hydrocarbons have higher octane values than acyclic or linear paraffinic hydrocarbons.

In conjunction with catalytic cracking to produce gasoline product, potential alkylate may result from the cracking process. This indirectly leads to product of increased octane because high octane, highly branched paraffinic gasoline blending stocks are synthesized from the potential alkylate. Unlike cracking, alkylation makes larger branched hydrocarbons from smaller hydrocarbons and these larger branched hydrocarbons are inherently higher in octane.

Feeds

The feedstock, that is, the hydrocarbons to be cracked, may include in whole or in part, a gas oil (e.g., light, medium, or heavy gas oil) having an initial boiling point above 400° F., a 50% point range of at least 500° F. and an end point range of at least 600° F. The feedstock may also include vacuum gas oils, thermal oils, residual oils, cycle stocks, whole top crudes, tar sand oils, shale oils, synthetic fuels, heavy hydrocarbon fractions derived from the destructive hydrogenation of coal, tar, pitches, asphalts, hydrotreated feedstocks derived from any of the foregoing, and the like. As will be recognized, the distillation of higher boiling petroleum fractions above about 750° F. must be carried out under vacuum in order to avoid thermal cracking. The boiling temperatures utilized herein are expressed in terms of convenience of the boiling point corrected to atmospheric pressure. Resids or deeper cut gas oils with high metals contents can also be cracked using the invention.

Process

The present invention provides a process for converting feedstock hydrocarbon compounds to product hydrocarbon compounds of lower molecular weight than the feedstock hydrocarbon compounds. In particular, the present invention provides a process for catalytically cracking a hydrocarbon feed to a mixture of products comprising gasoline in the presence of a cracking catalyst under catalytic cracking conditions. Catalytic cracking units which are amenable to the process of the invention operate at temperatures from 400° F. to 1600° F. and under reduced, atmospheric or superatmospheric pressure. The catalytic process can be either fixed bed, moving bed or fluidized bed and the hydrocarbon flow may be either concurrent or countercurrent to the catalyst flow. The process of the invention is particularly applicable to the Fluid Catalytic Cracking (FCC) or Thermofor Catalytic Cracking (TCC) processes. In both of these processes, the hydrocarbon feed and catalyst are passed through a reactor and the catalyst is regenerated. The two processes differ substantially in the size of the catalyst particles and in the engineering contact and transfer which is at least partially a function of catalyst size.

The TCC process is a moving bed and the catalyst is in the shape of pellets or beads having an average particle size of about one-sixty-fourth to one-fourth inch. Active, hot catalyst beads progress downwardly cocurrent with a hydrocarbon charge stock through a cracking reaction zone. The hydrocarbon products are separated from the coked catalyst and recovered, and the catalyst is recovered at the lower end of the zone and regenerated.

Typically preferred TCC conversion conditions include an average reactor temperature of from about 840° F. to about 950° F. catalyst/oil volume ratio of from about about 2 to about 7; reactor space velocity of from about about 1 to about 2.5 vol./hr./vol.; and recycle to fresh feed ratio of from 0 to about 0.5 (volume).

The process of the invention is particularly applicable to Fluid Catalytic Cracking. In fluidized catalytic cracking processes, the catalyst is a fine powder of abut 10 to 200 microns. This powder is generally suspended in the feed and propelled upward in a reaction zone. A relatively heavy hydrocarbon feedstock, e.g., a gas oil, is admixed with a suitable cracking catalyst to provide a fluidized suspension and cracked in an elongated reactor, or riser, at elevated temperatures to provide a mixture of lighter hydrocarbon products. The gaseous reaction products and spent catalyst are discharged from the riser into a separator, e.g., a cyclone unit, located within the upper section of an enclosed stripping vessel, or stripper, with the reaction products being conveyed to a product recovery zone and the spent catalyst entering a dense catalyst bed within the lower section of the stripper. In order to remove entrained hydrocarbons from the spent catalyst prior to conveying the latter to a catalyst regenerator unit, an inert stripping gas, e.g., steam, is passed through the catalyst bed where it desorbs such hydrocarbons conveying them to the product recovery zone. The fluidizable catalyst is continuously circulated between the riser and the regenerator and serves to transfer heat from the latter to the former thereby supplying the thermal needs of the cracking reaction which is endothermic.

Gas from the FCC main-column overhead receiver is compressed and directed with primary-absorber bottoms and stripper overhead gas through a cooler to the high pressure receiver. Gas from this receiver is routed to the primary absorber, where it is contacted by the unstabilized gasoline from the main-column overhead receiver. The net effect of this contacting is a separation between $C_3+$ and $C_2-$ fractions in the feed to the primary absorber. Primary absorber off-gas is directed to a secondary or sponge absorber, where a circulating stream of light cycle oil from the main column is used to absorb most of the remaining $C_5+$ material in the sponge absorber feed. Some $C_3$ and $C_4$ materials are also absorbed. The sponge-absorber rich oil is returned to the FCC main column. The sponge-absorber overhead, with most of the valuable $C_4+$ material removed but including $H_2S$, is sent to the fuel gas or other process streams.

Liquid from the high pressure separator is sent to a stripper where most of the $C_2-$ is removed overhead and sent back to the high pressure separator. The bottoms liquid from the stripper is sent to the debutanizer, where an olefinic $C_3$–$C_4$ product is further separated for gasoline production. The debutanizer bottoms, that is, the stabilized gasoline, are sent to treating, if necessary, and then to storage. The $C_3$ and $C_4$ product olefins can be directed to an alkylation unit to produce a high octane gasoline by the reaction of an iso-paraffin (usually iso-butane) with one or more of the low molecular weight olefins (usually propylene and butylene).

The FCC conversion conditions include a riser top temperature of from about 930° F. to about 1100° F., preferably from about 970° F. to about 1050° F., and most preferably from about 985° F. to about 1025° F.; catalyst/oil weight ratio of from about 3 to about 12, preferably from about 4 to about 11, and most preferably from about 5 to about 10; and catalyst residence time of from about 0.5 to about 15 seconds, preferably from about 1 to about 10 seconds.

Molecular Sieve Catalyst Component

The catalyst can contain any active component which has cracking activity. The active component may be a conventional large pore molecular sieve including zeolite X (U.S. Pat. No. 2,882,442); REX; zeolite Y (U.S. Pat. No. 3,130,007); Ultrastable Y zeolite (USY) (U.S. Pat. No. 3,449,070); Rare Earth exchanged Y (REY) (U.S. Pat. No. 4,415,438); Dealuminated Y (DAY Y) (U.S. Pat. No. 3,442,792; U.S. Pat. No. 4,331,694); Ultrahydrophobic Y (UHPY) (U.S. Pat. No. 4,401,556); and/or dealuminated silicon-enriched zeolites, e.g., LZ-210 (U.S. Pat. No. 4,678,765). Preferred are higher silica forms of zeolite Y. Zeolite ZK-5 (U.S. Pat. No. 3,247,195);, zeolite ZK-4 (U.S. Pat. No. 3,314,752); ZSM-20 (U.S. Pat. No. 3,972,983); zeolite Beta (U.S. Pat. No. 3,308,069); zeolite L (U.S. Pat. Nos. 3,216,789; and 4,701,315); and naturally occurring zeolites such as faujasite, mordenite and the like may also be used. These materials may be subjected to conventional treatments, such as impregnation or ion exchange with rare earths to increase stability. These patents are incorporated herein by reference. These large-pore molecular sieves have a pore opening of greater than about 7 Angstroms. In current commercial practice most cracking catalysts contain these large-pore molecular sieves. The preferred molecular sieve of those listed above is a zeolite Y, more preferably an REY or a USY.

Other large pore crystalline molecular sieves include pillared silicates and/or clays; aluminophosphates, e.g., $ALPO_4$-5, $ALPO_4$-8, VPI-5; silicoaluminophosphates, e.g., SAPO-5, SAPO-37, SAPO-31, SAPO-40; and other metal aluminophosphates. These are variously described in U.S. Pat. Nos. 4,310,440; 4,440,871; 4,554,143; 4,567,029; 4,666,875; 4,742,033; 4,880,611; 4,859,314; and 4,791,083, each incorporated herein by reference.

Additive FCC Catalysts

It is preferred to use an additive catalyst with different properties along with the conventional catalyst to form an optional mixed catalyst system. Preferred additives are shape-selective zeolites. Any zeolite having a Constraint Index of 1-12 can be used for this purpose. Details of the Constraint Index test are provided in *J. Catalysis* 67, 218-222 (1981) and in U.S. Pat. No. 4,711,710 both of which are incorporated herein by reference.

Preferred shape-selective zeolites are exemplified by intermediate pore (e.g., less than about 7 Angstroms pore size, such as from about 5 to less than about 7 Angstroms) zeolites ZSM-5 (U.S. Pat. No. 3,702,886 and Re. 29,948); ZSM-11 (U.S. Pat. No. 3,709,979); ZSM-12 (U.S. Pat. No. 4,832,449); ZSM-22 (U.S. Pat. No. 4,556,477); ZSM-23 (U.S. Pat. No. 4,076,842); ZSM-35 (U.S. Pat. No. 4,016,245); ZSM-48 (U.S. Pat. No. 4,397,827); ZSM-57 (U.S. Pat. No. 4,046,685); PSH-3 (U.S. Pat. No. 4,439,409); and MCM-22 (U.S. Pat. No. 4,954,325) either alone or in combination. In addition, the catalyst composition may include metals useful in promoting the oxidation of carbon monoxide to carbon dioxide under regenerator conditions as described in U.S. Pat. No. 4,350,614.

The preparation of some molecular sieve-containing catalysts may require reduction of the sodium content, as well as conversion to the acid (protonated) form. For example, with zeolites this can be accomplished by employing the procedure of converting the zeolite to an intermediate ammonium form as a result of ammonium ion exchange followed by calcination to provide the hydrogen form. The operational requirements of these procedures are well known in the art.

The source of the ammonium ion is not critical; thus the source can be ammonium hydroxide or an ammonium salt such as ammonium nitrate, ammonium sulfate, ammonium chloride and mixtures thereof. These reagents are usually in aqueous solutions; by way of illustration, aqueous solutions of 1N $NH_4OH$, 1N $NH_4NO_3$, 1N $NH_4Cl$, and 1N $NH_4Cl/NH_4OH$ have been used to effect ammonium ion exchange. The pH of the ion exchange is not critical but is generally maintained at 7 to 12. Ammonium exchange may be conducted for a period of time ranging from about 0.5 to about 20 hours at a temperature ranging from ambient up to about 212° F. The ion exchange may be conducted in a single stage or in multiple stages. Calcination of the ammonium exchanged zeolite will produce its acid form. Calcination can be effected at temperatures up to about 1200° F.

Matrix

The molecular sieve material is incorporated with a matrix resistant to the temperatures and other conditions e.g., mechanical attrition, which occur in various hydrocarbon conversion processes such as cracking. It is generally necessary that the catalysts be resistant to mechanical attrition, that is, the formation of fines which are small particles, e.g., less than 20 μm. The cycles of cracking and regeneration at high flow rates and temperatures, such as in an FCC process, have a tendency to break down the catalyst into fines, as compared with an average diameter of catalyst particles of about 60–90 microns. In an FCC process, catalyst particles range from about 10 to about 200 microns, preferably from about 20 to 120 microns. Excessive generation of catalyst fines increases the refiner's catalyst costs.

The matrix may fulfill both physical and catalytic functions. Matrix materials include active or inactive inorganic materials such as clays, and/or metal oxides such as alumina or silica. The metal oxides may be in the form of a gelatinous precipitate or gel.

Use of an active matrix material in conjunction with the molecular sieve component that is combined therewith, may enhance the conversion and/or selectivity of the overall catalyst composition in certain hydrocarbon conversion processes. Inactive materials may serve as diluents to control the amount of conversion in a given process so that products can be obtained economically and in an orderly fashion without employing other means for controlling the rate of reaction. These materials may be incorporated as naturally occurring clays to improve the attrition resistance of the catalyst under commercial operating conditions.

Naturally occurring clays which can be composited with the catalyst include the montmorillonite and kaolin families which include the subbentonites, and the kaolins commonly known as Dixie, McNamee, Georgia and Florida clays or others in which the main mineral constituent is halloysite, kaolinite, dickite, nacrite or anauxite. Such clays can be used in the raw state as originally mined or initially subjected to calcination, acid treatment or chemical modification.

In addition to the foregoing materials, catalysts can be composited with a porous matrix material such as silica-alumina, silica-maqnesia, silica-zirconia, silica-thoria, silica-beryllia, silica-titania, as well as ternary materials such as silica-alumina-thoria, silica-alumina-zirconia, silica-alumina-magnesia, silica-magnesia-zirconia. The matrix can be in the form of a cogel. A mixture of these components can also be used.

The relative proportions of finely divided, crystalline molecular sieve component and inorganic oxide gel matrix vary widely, with the molecular sieve content ranging from about 1 to about 90 percent by weight, and more usually from about 2 to about 80 weight percent of the composite.

A large pore molecular sieve material may comprise from about 10 to about 80 weight percent of the total catalyst composition. An intermediate pore molecular sieve material may comprise from about 1 to about 50 weight percent of the total catalyst composition.

The matrix material of the present invention comprises boron phosphate as an essential component. In a preferred embodiment, the matrix also comprises silica and kaolin or bentonite clays. The matrix, however, may also contain other preferred components such as alumina, titania, zirconia and magnesia.

The boron phosphate is incorporated into the matrix material preferably before the matrix is combined with the molecular sieve or zeolite. The matrix material may be prepared as an aqueous slurry which is combined with a slurry of the zeolite as described in the examples.

The boron phosphate concentration in the final catalyst composition (dry basis) is from about 0.1 to about 5 weight percent, preferably from about 0.3 to about 3.5 weight percent.

The zeolite slurry may be formed by deagglomerating the zeolite, preferably in an aqueous solution. The slurry of the matrix material may be formed by mixing the desired matrix components such as clay, inorganic oxide and boron phosphate in an aqueous solution. The zeolite slurry and the matrix slurry are then well mixed and spray dried to form catalyst particles of, for example, less than 200 microns in diameter.

The catalyst composition may be steamed at a temperature of from about 1000° F. to about 1500° F. for a time of from about 1 to about 30 hours in about 40 to about 100 weight percent steam.

The following examples illustrate the invention.

EXAMPLE 1

A slurry A was prepared by ballmilling 750 grams of REY zeolite (Davison Chemical Division of W.R. Grace & Co. Baltimore, Md., SMR6-1801, dry basis) with 4.5 grams of dispersant (Marasperse N-22, Reed-Lignin, Inc., Greenwich, Conn.) and 1338 grams of deionized (DI) water in a one-gallon porcelain ballmill containing 7.8 pounds of ½ inch agate stones. After 16 hours, 1491 grams of DI rinse water was added. One more batch was prepared in a similar manner. Both batches were combined to complete preparation of slurry A.

To prepare slurry B, in a separate stirred vessel, 1736 grams of kaolin clay (Georgia Kaolin Co., Elizabeth, N.J., 86.16% solids), 8973.5 grams of sodium silicate obtained as N-Clear (PQ Corp., Valley Forge, Pa., 28.8% $SiO_2$, 8.8% $Na_2O$), and 94.1 pounds of ice water were mixed. The resultant slurry was successively neutralized by 843 grams of 96.2% $H_2SO_4$ and 12.85 pounds of aluminum sulfate (General Chemicals Co., Morristown, N.J.) solution (solution C) containing 193 grams $Al_2O_3$.

To slurry B, 15.5 pounds of slurry A (20.3% solids) was added and mixed. The resulting slurry mixture was dewatered, reslurried to 12% solids, homogenized and spray dried at 370 ± 10° F. outlet temperature. The spray dryer (Komline-Sanderson, Peapack, N.J.) was operated at 5.5 psig air pressure with a 0.06 inch nozzle at 250 cc/min. feed rate using a Moyno feed pump (Springfield, Ohio).

After spray drying, the microspheres were batch exchanged with 1N ammonium nitrate solution (5cc/gm) and dried overnight in a muffle furnace at 250° F.

This resulted in 5700 grams of a control catalyst containing (on a dry weight basis) 25% REY, 45.3% silica, 3.4% alumina, and 26.3% kaolin clay.

EXAMPLE 2

The procedure described in Example 1 was modified by scaling down the preparation to 1400 grams total and, instead of solution C, adding solution D prepared by dissolving 47.7 grams of boron phosphate (Alfa Products, Thiokol/Ventron Division, Ward Hill, Mass.) in 2.72 pounds of DI water.

The nominal composition of the finished catalyst (dry weight basis) was 25% REY, 45.3% silica, 3.4% boron phosphate, and 26.3% koalin clay. The boron phosphate replaced the alumina of Example 1.

EXAMPLE 3

Samples of the catalysts prepared in Examples 1 and 2 were calcined in air at 1200° F. for 2 hours. The calcined and uncalcined catalysts of Examples 1 and 2 were tested for their Attrition Index. The Attrition Index is defined as the percent of less than 20 micron fines generated during the test. In the test, 7.0 cc of catalyst sample is contacted in a 1.0 inch (inside diameter) U tube with an air jet formed by passing humidified (60%) air through a 0.07 inch nozzle at 21 liters per minute for one hour. The lower the Total Attrition Index (TAI), the more attrition resistant is the catalyst. The TAI values are obtained by summing up individual Attrition Index (AI) values for uncalcined and calcined samples.

The TAI results along with densities and porosities are summarized in Table I.

TABLE I

| Properties and Attrition Resistance of Cracking Catalysts | | |
|---|---|---|
| Catalysts of Example | 1 | 2 |
| Chemical Properties (db)[1] | | |

TABLE I-continued

Properties and Attrition Resistance of Cracking Catalysts

| Catalysts of Example | 1 | 2 |
|---|---|---|
| Na, ppm | 1060 | 1400 |
| Rare earth oxides, wt % | 2.8 | 3.3 |
| Boron, wt % | — | 0.21 |
| Phosphorus, wt % | — | 0.6 |
| Physical Properties (db)[(2)] | | |
| PV, cc/gm | 0.39 | 0.42 |
| SA, m2/gm | 116 | 78 |
| AI | | |
| a. Uncalcined | 25 | 25 |
| b. Calcined[(3)] | 15 | 18 |
| c. TAI (a + b) | 40 | 43 |

[(1)] All samples are NH4+/Na+ exchanged followed by overnight air drying at 250° F.
[(2)] After steaming at 1450° F., 0 psig, 45% steam for 10 hours.
[(3)] After air calcination at 1200° F. for 2 hours.
db = dry basis From Table I, it can be concluded that the boron phosphate did not significantly affect the catalyst attrition resistance. When introduced into the matrix, boron phosphate does not appear to impart improved physical properties.

EXAMPLE 4

To determine the effect of boron phosphate catalytic performance, the catalysts of Examples 1 and 2 were evaluated in a fixed-fluidized bed (FFB) unit at 960° F., 1.0 minute catalyst contact time. The feed was Joliet Sour Heavy Gas Oil (JSHGO) and its properties are described in Table II. The catalyst/oil ratios were varied. The FFB results (after interpolation at 65 vol. % conversion) are summarized in Table III.

TABLE II

| Charge Stock | Joliet Sour Heavy Gas Oil (JSHGO) |
|---|---|
| Gravity, API | 24.3 |
| Aniline Pt., °F. | 171 |
| Hydrogen, wt % | 12.3 |
| Sulfur, wt % | 1.87 |
| Nitrogen, wt % | 0.10 |
| Basic Nitrogen, ppm | 327 |
| Conradson Carbon, wt % | 0.28 |
| K.V. @ 210° F., cst. | 3.6 |
| Bromine No. | 4.2 |
| R.I. at 70° F. | 1.5080 |
| Molecular Weight | 358 |
| Pour Point, °F. | 85 |
| Paraffins, wt % | 23.5 |
| Napthhenes, wt % | 32.0 |
| Aromatics, wt % | 44.5 |
| Aromatic Carbon, wt % | 18.9 |
| Ni, ppm | 0.3 |
| V, ppm | 0.6 |

TABLE III

Effect of Boron Phosphate on Catalytic Performance
(Catalysts Steamed for 10 hours at 1450° F., 45% steam, 0 psig)

| Catalysts of Example | 1 | 2 |
|---|---|---|
| Conversion, Wt % (@ 65 vol %) | 62.3 | 62.1 |
| Product Yields | | |
| C5+ Gasoline, wt % | 44.2 | 42.9 |
| Total C4's, wt % | 8.0 | 8.7 |
| Dry Gas, wt % | 7.9 | 8.1 |
| Coke, wt % | 2.3 | 2.7 |
| Gasoline + Potential Alkylate, vol % | 74.5 | 75.4 |
| Gasoline | | |
| RON | 85.8 | 88.8 |

TABLE III-continued

Effect of Boron Phosphate on Catalytic Performance
(Catalysts Steamed for 10 hours at 1450° F., 45% steam, 0 psig)

| Catalysts of Example | 1 | 2 |
|---|---|---|
| MON | 77.5 | 78.9 |
| Gasoline + Poten. Alkylate | | |
| RON | 88.2 | 90.4 |

As is evident in Table III, the use of boron phosphate results in octane/yield shifts as compared with the control of Example 1 which included a conventional matrix. The use of boron phosphate in the matrix results in the following improvements:

3.0 RON boost in gasoline octane
1.4 MON boost in gasoline octane
2.2 RON boost in gasoline + potential alkylate There was no penalty in gasoline + potential alkylate yield although the gasoline yield is lower. The gasoline loss is partially accounted for by higher $C_4$ yields.

The potential alkylate production is important because a supply of raw materials for alkylation ultimately results in isoparaffinic alkylate of high octane number.

It has been shown that the use of boron phosphate as a binder shows no improvement in the physical properties, e.g., attrition resistance, when applied to a fluid cracking catalyst. However, unexpectedly, the catalyst produces gasoline of higher octane.

While there have been described what are presently believed to be the preferred embodiments of the invention, those skilled in the art will realize that changes and modifications may be made thereto without departing from the spirit of the invention, and it is intended to claim all such changes and modifications as fall within the true scope of the invention.

What is claimed is:

1. A process for catalytic cracking of feedstock hydrocarbon compounds to product hydrocarbon compounds having a lower molecular weight than the feedstock hydrocarbon compounds which comprises contacting said feedstock at catalytic cracking conditions with a catalyst composition comprising a catalytic molecular sieve material and a matrix material comprising boron phosphate compound.

2. The process of claim 1 wherein the molecular sieve material comprises a large-pore crystalline material having a pore opening of greater than about 7 Angstroms.

3. The process of claim 1 wherein the molecular sieve material comprises a zeolite having a Constraint Index of from 1 to 12.

4. The process of claim 1 wherein the molecular sieve material is selected from the group consisting of large-pore zeolites X, Y, REX, REY, USY, dealuminated Y, ultrahydrophobic Y, silicon-enriched dealuminated Y, ZK-4, ZK-5, ZSM-20, Beta, L, large-pore materials SAPO-5, SAPO-31, SAPO-37, SAPO-40, pillared silicates, pillared clays, intermediate-pore zeolites ZSM-5, ZSM-11, ZSM-12, ZSM-22, ZSM-23, ZSM-35, ZSM-48, ZSM-57, PSH-3, MCM-22, and combinations thereof.

5. The process of claim 4 wherein the molecular sieve material comprises zeolite REY.

6. The process of claim 1 wherein the matrix material further comprises at least one member of the group consisting of silica, alumina, titania, zirconia, magnesia, kaolin, bentonite, and combinations thereof.

7. The process of claim 1 wherein the molecular sieve material comprises a large-pore molecular sieve in an amount of from about 10 to about 80 weight percent of the total catalyst composition.

8. The process of claim 1 wherein the molecular sieve material comprises an intermediate-pore molecular sieve material in an amount of from about 1 to about 50 weight percent of the total catalyst composition.

9. The process of claim 1 wherein the matrix material comprises boron phosphate in an amount of from about 0.1 to about 5 weight percent of the total catalyst composition on a dry basis.

10. The process of claim 1 wherein the catalyst composition has been synthesized by a method comprising:
    forming a first slurry of the molecular sieve material;
    forming a second slurry of matrix material containing boron phosphate compound;
    mixing together the first and second slurries to form a slurry mixture;
    drying the slurry mixture to form a catalyst composition.

11. The process of claim 10 wherein the catalyst composition synthesis method further comprises deagglomerating the molecular sieve material in an aqueous solution to form the first slurry and preparing the second slurry by combining clay, inorganic oxides, and boron phosphate in an aqueous solution.

12. The process of claim 10 wherein the catalyst composition synthesis method further comprises steaming the catalyst composition to a temperature of from about 1000° F. to about 1500° F. for a time of about 1 to about 30 hours in from about 40 to about 100 weight percent steam.

13. The process of claim 10 wherein the molecular sieve material is selected from the group consisting of large-pore zeolites X, Y, REX, REY, USY, dealuminated Y, ultrahydrophobic Y, silicon-enriched dealuminated Y, ZK-4, ZK-5, ZSM-20, Beta, L, large-pore materials SAPO-5, SAPO-31, SAPO-37, SAPO-40, pillared silicates, pillared clays, intermediate-pore zeolites ZSM-5, ZSM-11, ZSM-12, ZSM-22, ZSM-23, ZSM-35, ZSM-48, ZSM-57, PSH-3, MCM-22, and combinations thereof.

14. The process of claim 10 wherein the matrix material further comprises at least one member of the group consisting of silica, alumina, titania, zirconia, magnesia, kaolin, bentonite, and combinations thereof.

15. The process of claim 10 wherein the molecular sieve material comprises a large-pore molecular sieve in an amount of from about 10 to about 80 weight percent of the total catalyst composition.

16. The process of claim 10 wherein the molecular sieve material comprises an intermediate-pore molecular sieve material in an amount of from about 1 to about 50 weight percent of the total catalyst composition.

17. The process of claim 10 wherein the matrix material comprises boron phosphate in an amount of from about 0.1 to about 5 weight percent of the total catalyst composition on a dry basis.

18. The process of claim 1 wherein said catalytic cracking conditions include an average reactor temperature of from about 840° F. to about 950° F., a catalyst/oil volume ratio of from about 2 to about 7, and a space velocity of from about 1 to about 2.5.

19. The process of claim 10 wherein said catalytic cracking conditions include an average reactor temperature of from about 840° F. to about 950° F., a catalyst/oil volume ratio of from about 2 to about 7, and a space velocity of from about 1 to about 2.5.

20. The process of claim 1 wherein said catalytic cracking conditions include a riser top temperature of from about 930° F. to about 1100° F., a catalyst/oil weight ratio of from about 3 to about 12, and a catalyst residence time of from about 0.5 to about 15 seconds.

21. The process of claim 10 wherein said catalytic cracking conditions include a riser top temperature of from about 930° F. to about 1100° F., a catalyst/oil weight ratio of from about 3 to about 12, and a catalyst residence time of from about 0.5 to about 15 seconds.

* * * * *